United States Patent
Levy

(10) Patent No.: US 9,917,474 B2
(45) Date of Patent: Mar. 13, 2018

(54) SYSTEMS FOR PROVIDING EMERGENCY POWER DURING A POWER INTERRUPTION

(71) Applicant: GENERAL ELECTRIC COMPANY, Schenectady, NY (US)

(72) Inventor: Yehuda Daniel Levy, Lod (IL)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 192 days.

(21) Appl. No.: 14/946,817

(22) Filed: Nov. 20, 2015

(65) Prior Publication Data

US 2017/0149272 A1    May 25, 2017

(51) Int. Cl.
| | |
|---|---|
| *H02J 9/06* | (2006.01) |
| *H05B 33/08* | (2006.01) |
| *H02J 7/00* | (2006.01) |
| *H05B 37/02* | (2006.01) |

(52) U.S. Cl.
CPC ............ *H02J 9/061* (2013.01); *H02J 7/0068* (2013.01); *H02J 9/06* (2013.01); *H05B 33/0806* (2013.01); *H05B 33/0842* (2013.01); *H05B 37/0227* (2013.01)

(58) Field of Classification Search
None
See application file for complete search history.

(56) References Cited

U.S. PATENT DOCUMENTS

| | | | |
|---|---|---|---|
| 8,192,039 B1 | 6/2012 | Moe et al. | |
| 9,544,967 B2* | 1/2017 | Recker | H05B 33/0854 |
| 2005/0157482 A1* | 7/2005 | Hsu | H02J 9/065 |
| | | | 362/20 |
| 2013/0147269 A1 | 6/2013 | Zimmermann et al. | |
| 2015/0194843 A1 | 7/2015 | Singer et al. | |

OTHER PUBLICATIONS

International Search Report and Written Opinion issued in connection with corresponding PCT Application No. PCT/US2016/061736 dated Feb. 6, 2017.

* cited by examiner

*Primary Examiner* — Jeffrey Zweizig
(74) *Attorney, Agent, or Firm* — Peter T. DiMauro; GE Global Patent Operation

(57) ABSTRACT

Provided is a backup power system for providing power to a load when a primary lighting system is disabled. The backup power system includes an energy source configured to supply an amount of power to the backup power system, and a charger connectable to the energy source and a power source of the primary lighting system. The backup power system additionally includes a controller configured to measure a current value of the primary lighting system and determine a backup current value corresponding to an amount of backup current that is a fractional amount of the determined current value. The backup power system include a current source configured to provide the determined backup current.

19 Claims, 3 Drawing Sheets

SYSTEMS FOR PROVIDING EMERGENCY POWER DURING A POWER INTERRUPTION

I. FIELD OF THE INVENTION

The present invention relates generally to backup power systems. More specifically, the present invention relates to initiating the use of backup power systems during a power interruption of primary lighting systems.

II. BACKGROUND OF THE INVENTION

Emergency power systems provide an independent source of electrical power that supports important electrical systems during loss of normal power supply. These power systems, also known as backup or standby power systems, may include components such as generators, batteries, or other apparatuses designed to support power to a system for a predetermined period of time.

Conventional backup power systems use a backup luminaire (e.g., light emitting diode (LED) luminaire) that typically produces less light than a main luminaire of an overall lighting system. However, conventional backup lighting sources have a number of drawbacks. For example, in conventional backup lighting systems, the backup luminaire is separate and distinct from the main luminaire. Separate luminaires can limit functionality of the backup lighting system, for example, by not allowing communication between the backup luminaire and the main luminaire. Also, separate luminaires require maintenance for two luminaires instead of one which may increase cost associated with the lighting system.

Additionally, conventional backup lighting systems do not adjust their power output based on system fluctuations, such as a power surge from an energy source. As a result, too much power can be delivered to a particular device, ultimately leading to failure.

Furthermore, conventional backup lighting systems require complex wiring configurations. These complex configurations account for different scenarios where a backup (emergency) driver must be configured to receive inputs from varying scenarios such an ordinary driver or a load.

III. SUMMARY OF THE EMBODIMENTS

Given the aforementioned deficiencies, a need exists for a backup power system that adapts based on fluctuations of a normal power supply from a primary lighting system.

Embodiments of the present invention include a backup power system for providing power to a load when a primary lighting system is disabled. The backup power system includes an energy source configured to supply an amount of power to the backup power system, and a charger connectable to the energy source and a power source of the primary lighting system. The backup power system additionally includes a controller configured to measure a current value of the primary lighting system. The controller also calculates a backup current value corresponding to an amount of backup current that is a fractional amount of the current value of the primary lighting system. Also, the backup power system include a current source configured to provide the load the amount of backup current calculated by the controller.

In some embodiments, the energy source is in electrical connection with the charger and the current source using connection wires. In some embodiments, connection wires are configured to connect with an external portal for programming the controller.

In some embodiments, the power supply is configured to be connectable to a driver of the primary lighting system. In some embodiments, a switch in electrical connection with the driver and the current source, the switch allowing the backup current to flow to the load when the switch is in a closed position.

In some embodiments, the controller is configured to receive the current value required by the primary lighting system to sustain the load.

Also provided is a computer-readable storage device that cause a processor to perform operations, associated with providing backup power using a backup power system to a load when a primary lighting system is disabled. The operations include receiving input data comprising an initial current value corresponding to an amount of energy required by the primary lighting system to sustain a load at a first time. The operations also include calculating, a backup current value that is a fractional amount of the initial current value. The backup current value corresponds to an amount of backup current needed to sustain at least a portion of the load. The operations also include providing, when a power source in connection with the primary system is disabled, the backup current amount to the load using a current source within the backup power system.

In some embodiments, the backup power system provides the backup current amount by closing a switch in connection with the load, a driver of the primary lighting system, and the current source of the backup power system.

In some embodiments, the operations further include deactivating the backup power system where an energy source of the backup power system is depleted.

An advantage of the embodiments is automatic adjusting of the load based on the learning and interpreting the power (e.g., charge) that should be maintained within the backup system.

Another advantage of the embodiments is providing for easy replacement of existing backup systems within because the primary lighting systems. Any backup systems within the primary lighting systems can be replaced using existing wiring within the primary lighting system. Configurable to connect to existing backup power systems Yet another advantage of the illustrious embodiments is the replaceability of the backup power source. For example, backup power source can be disconnected and can be replaced with any number of power sources including mobile batteries.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

IV. BRIEF DESCRIPTION OF THE DRAWINGS

To provide a thorough understanding of the present disclosure, embodiments of the present invention are described below with reference to the accompanying drawings, wherein.

V. DETAILED DESCRIPTION

While illustrative embodiments are described herein with illustrative embodiments for particular implementations, it should be understood that the invention is not limited thereto. Those skilled in the art with access to the teachings provided herein will recognize additional modifications, applications, and embodiments within the scope thereof, and additional fields in which the lighting systems described herein would be of significant utility.

The following detailed description is merely exemplary in nature and is not intended to limit the applications and uses disclosed herein. Further, there is no intention to be bound by any theory presented in the preceding background or summary or the following detailed description.

In some instances, well-known components, systems, materials, or methods have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

The embodiments address concerns associated with the use of backup power systems when a primary power system goes offline. The described embodiments are associated with backup lighting systems. However, one of skill in the art would recognize the backup system can be used for any number of applications.

Figure 1:
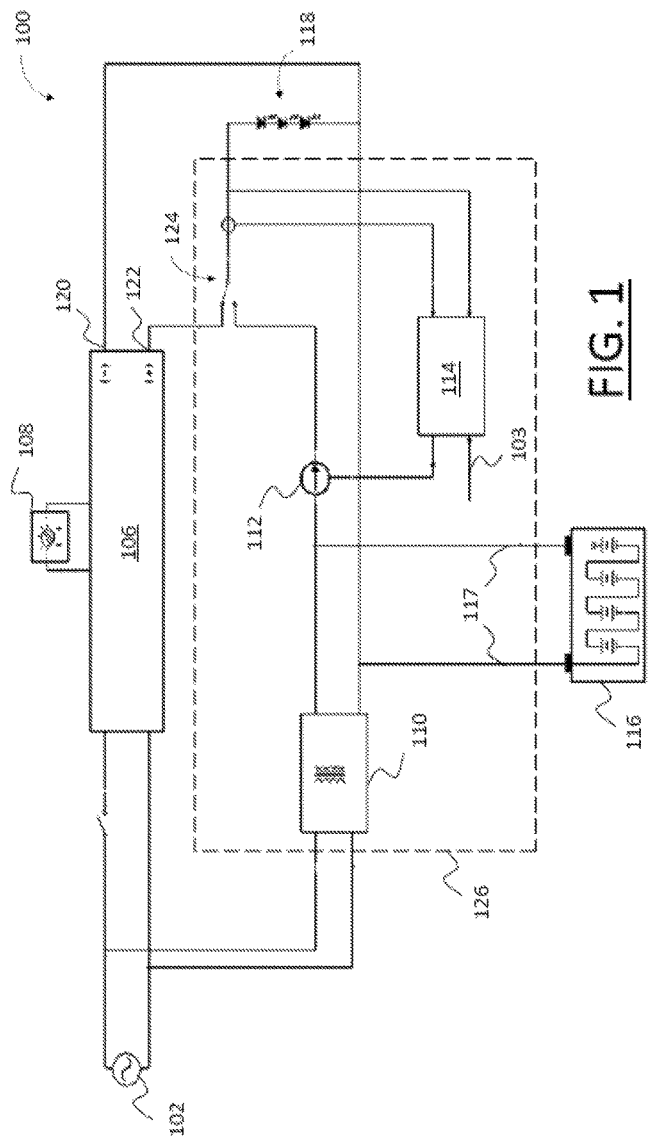
FIG. 1 is an illustration of an exemplary backup lighting system in accordance with the embodiments of the invention.

FIG. 1 is an illustration of a primary lighting system 100 and a backup lighting system 126. The backup lighting system 126 is enabled when the primary lighting system 100 is disabled, such as during a power outage. The primary lighting system 100 is powered by a power source 102 and operated by a driver 106 in connection to a load 118 (e.g., luminaire).

The power source 102 is a high current source used to provide energy to the load 118. The power source 102 is typically an alternating current (AC), but can also be a direct current (DC).

The driver 106 is a self-contained power supply which has outputs matched to the electrical characteristics of the load 118.

In some embodiments, the driver 106 is a constant current driver whose power supply varies voltage across an electronic circuit within the driver 106, thus allowing the driver 106 to maintain a constant electric current regardless of variation in voltage. Constant current drivers are suitable for applications where power (e.g., light emitted) without variations intended across a surface (e.g., a lens or display).

In some embodiments, the driver 106 is a constant voltage driver that maintains a constant voltage. Constant voltage drivers are suitable for applications where variances in power are acceptable.

In other embodiments, the driver 106 is retrofitted for connection with the backup lighting system 126. The backup lighting system 126 may be integrated into a primary lighting system not equipped with a backup system. Alternatively, the backup lighting system 126 may replace a pre-existing backup power system (not illustrated) in situations where the backup lighting system 126 consumes less energy than the pre-existing backup power system. For example, to retrofit the backup lighting system 126 where a pre-existing backup power system exists, a negative port 120 of the driver 106 remains in electrical connection with the load 118. At the same time, a positive port 122 of the driver 106 is disconnected from the pre-existing backup system and connected to the backup lighting system 126, more particularly to a switch 124.

In the embodiments, the driver 106 is connectable to a dimmer 108 that allows reduction of light produced by the primary lighting system 100. The dimmer 108 can operate, for example, by means of pulse width modulation circuits or analog dimming.

Unlike conventional backup systems that power a backup load separate and distinct from a load of a primary lighting system, the backup lighting system 126 provides power to the load 118 (e.g., luminaire) of the primary lighting system 100. In other words, the backup lighting system provides power to the same load as the primary lighting system. Additionally, the backup lighting system 126, using a current source (e.g., programmable current source 112), is configured to operate with the driver 106 to support any number of loads (e.g., any number of luminaires).

The backup lighting system 126 is used to provide a steady flow of energy to emergency devices (e.g., exit signs), electronic devices (e.g., computers), communication networks, and other equipment (e.g., elevators) that may be required during a power interruption. The backup lighting system 126 is intended to operate for a specified amount of time during a power interruption (e.g., outage) of the power source 102. By way of example only, and not limitation, the backup lighting system 126 can operate between 60 minutes and 180 minutes during a power outage.

When a power interruption occurs, the backup lighting system 126 maintains a portion of energy to power to the load 118. In other words, the backup lighting system 126 provides the primary lighting system 100 with a fractional amount of the power as compared to the power source 102 and the driver 106. The fractional amount of power may be dependent on factors such as, but not limited to, a load current of the primary lighting system 100 or the designated amount of time the backup lighting system 126 is intended to operate during a power outage. For example, since the backup lighting system 126 provides power to the load 118, proving a one half (½) load current to the load 118 will discharge a backup lighting system power source (e.g., energy source 116) quicker than providing a one fourth (¼) load current to the load 118.

Where the backup lighting system 126 is added to the primary lighting system 100 or replaces a pre-existing backup power system, the backup lighting system 126 may be installed by disconnecting the positively charged wire output from the driver 106 to the load 118 (e.g., LED luminaire) and connecting this wire to the backup lighting system 126. The negatively charged wire output from the drive 106 remains in connection with the load 118.

The backup lighting system 126 includes charger 110, a programmable current source 112, and a controller 114. The backup lighting system 126 is powered using an energy source 116.

The energy source 116 can be any energy source that provides power to the backup lighting system 126. In some embodiments of the present invention, the energy source 116 can be positioned internal to the backup lighting system 126. In other embodiments, the energy source 116 can be positioned external from the backup lighting system 126.

Energy is provided to and from the energy source 116 by way of one or more connection wires 117. In the embodiments, the connection wires 117 allow the energy source 116 to be disconnected from the backup lighting system 126, for example during maintenance.

Additionally, the connection wires 117 can be used for pairing the backup lighting system 126 to an external device programming or testing. For example, the connection wires 117 can be connected to an external device (e.g., a computer) configured to communicate information to the controller 114. Utilizing the connection wires 117 for programming eliminates the need for programming terminals within the backup lighting system 126.

The charger 110 receives power (e.g., AC power) from the power source 102, and when the power source 102 is unavailable (e.g., a power outage), the charger 110 stops charging. In the embodiments, the charger 110 can provide a small charge (e.g., 10-15 watts) to the energy source 116 when power received from the power supply 102 (e.g., AC power) is acceptable.

As an example, when the power source 102 is operational, the charger 110 provides energy to the energy source 116. However, when the power source 102 fails (e.g., during a power outage), the energy stored within the energy source 116 is supplied to the backup lighting system 126. When the power source 102 recovers (e.g., power resumes), the load current is again provided by the driver 106 and the energy source 116 receiving charge from the charger 110.

In an exemplary embodiment, the charger 110 is implemented as a fly back configuration or using one or more components such as, but not limited to, rectifiers, transistors (e.g., field-effect transistors, bipolar junction transistors, junction field-effect transistors, metal oxide field effect transistors), transformers, resistors, and storage devices (e.g., capacitors), and the like.

The programmable current source 112 provides energy to the load 118 during a power outage. Specifically, the programmable current source 112 receives, from the controller 114, a backup current value ($I_{backup}$), and as a result, provides current to the load 118. The backup current value is determined based on a load current of the primary lighting system 100. By obtaining the load current of the primary lighting system 100, cumbersome and complex wiring found in the conventional backup power systems can be reduced or eliminated. Determination of the backup current value is described in greater detail in association with FIG. 3.

In an exemplary implementation, the programmable current source 112 is implemented as a boost stage electrical configuration including one or more components such as, but not limited to, inductors (e.g., iron core), transistors, directional diodes, resistors, and storage devices.

The controller 114 is used to communicate information (e.g. the backup current value ($I_{backup}$)) to the programmable current source 112. The controller 114 can schedule periodic diagnostic testing of the energy source 116 or other components of the backup lighting system 126. As an example, where the energy source 116 is positioned external to the backup lighting system 126, the connection wires 117 are used to connect to another energy source, such as a battery.

Additionally, the controller 114 can provide a port for additional options for operating the energy source 116. For example, the port can provide add-on features such as wireless communication (e.g., Bluetooth) or visible light communications (VLC).

Figure 2:
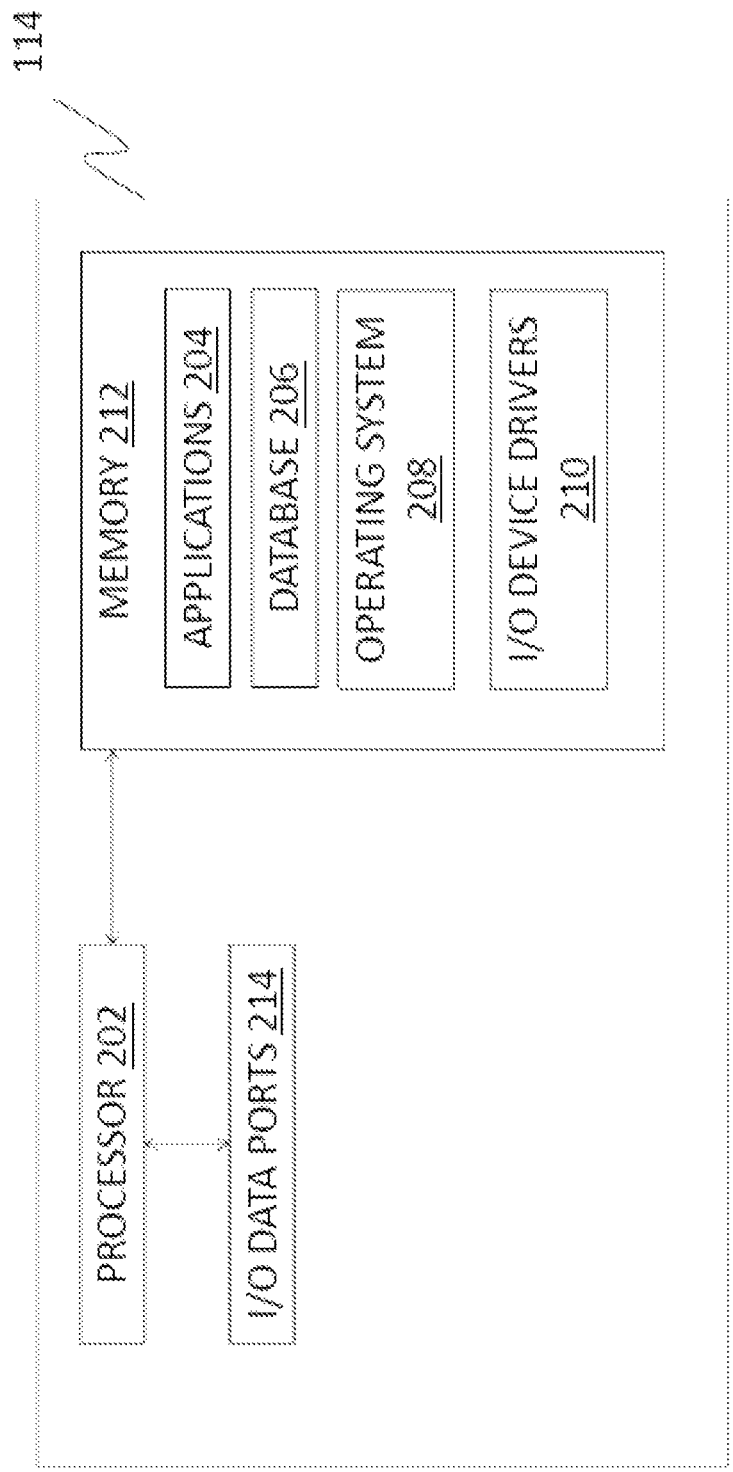
FIG. 2 is an illustration of an exemplary controller for use in the backup lighting system FIG. 1.

FIG. 2 is an illustration an exemplary controller 114. The controller 114 is an adjustable hardware developed through the use of code libraries, static analysis tools, software, hardware, firmware, or the like. The controller 114 includes a memory 212. The memory 212 can include several categories of software and data used in the controller 114, including, an application 204, a database 206, an operating system 208, and I/O device driver 210.

As will be appreciated by those skilled in the art, the operating system 208 can be any operating system for use with a data processing system. The I/O device driver 210 may include various routines accessed through the operating system 208 by the application 204 to communicate with devices and certain memory components.

The application 204 can be stored in the memory 212 and/or in a firmware (not shown in detail) as executable instructions and can be executed by a processor 202.

The processor 202 can be formed of multiple processors, which can include distributed processors or parallel processors in a single machine or multiple machines. The processor 202 can be used in supporting a virtual processing environment. The processor 202 may be a microcontroller, microprocessor, application specific integrated circuit (ASIC), programmable logic controller (PLC), complex programmable logic device (CPLD).

The processor 202 can also be a programmable gate array (PGA) including a Field PGA, or the like. References herein to processor executing code or instructions to perform operations, acts, tasks, functions, steps, or the like, could include the processor 202 performing the operations directly and/or facilitating, directing, or cooperating with another device or component) perform the operations.

The application 204 include various programs and software logic that, when executed by the processor 202, process data received by the backup lighting system 126.

The application 204 can be applied to data stored in the database 206, along with data, e.g., received via I/O data ports 214. The database 206 represents the static and dynamic data used by the application 204, the operating system 208, the device driver 106 and other software programs that may reside in the memory 212.

While the memory 212 is illustrated as residing proximate the processor 202, it should be understood that at least a portion of the memory 212 can be a remotely accessed storage system, for example, a server on a communication network, a remote hard disk drive, a removable storage medium, combinations thereof, and the like. Thus, any of the data, applications, and/or software described above can be stored within the memory 212 and/or accessed via network connections to other data processing systems (not shown) that may include a local area network (LAN), a metropolitan area network (MAN), or a wide area network (WAN), for example.

It should be understood that FIG. 2 and the description above are intended to provide a brief, general description of a suitable environment in which the various aspects of some embodiments of the present disclosure can be implemented. While the description refers to computer-readable instructions, embodiments of the present invention can also be implemented in combination with other program modules and/or as a combination of hardware and software in addition to, or instead of, computer readable instructions.

The term "application," or variants thereof, is used expansively herein to include routines, program modules, programs, components, data structures, algorithms, and the like. Applications can be implemented on various system configurations including single-processor or multiprocessor systems, minicomputers, mainframe computers, personal computers, hand-held computing devices, microprocessor-based programmable consumer electronics, combinations thereof, and the like.

Figure 3:
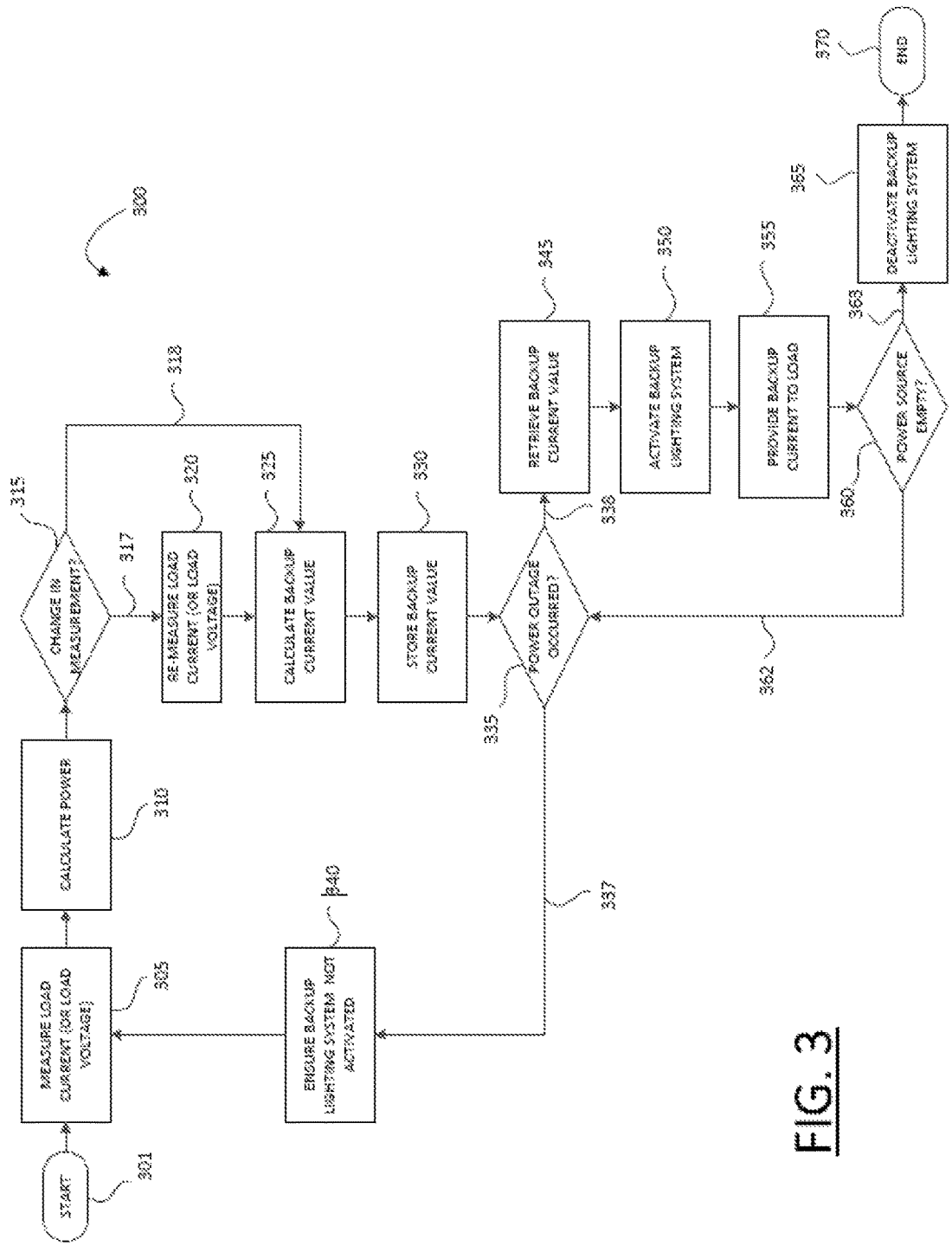
FIG. 3 is a flow diagram of an exemplary application of the controller of FIG. 2.

FIG. 3 is a flow diagram of an illustration of an exemplary learning sequence 300 of an executed by the controller 114. The learning sequence 300 may be stored as an application 204 within the controller. The learning sequence 300 represents functions performed by the processor 202 executing software for producing the deliverables described.

It should be understood that the steps of the methods are not necessarily presented in any particular order and that performance of some or all the steps in an alternative order, including across these figures, is possible and is contemplated.

The steps have been presented in the demonstrated order for ease of description and illustration. Steps can be added, omitted and/or performed simultaneously without departing from the scope of the appended claims. It should also be understood that the illustrated method or sub-methods can be ended at any time.

In certain embodiments, some or all steps of this process, and/or substantially equivalent steps are performed by a processor, e.g., computer processor, executing computer-executable instructions, corresponding to one or more corresponding algorithms, and associated supporting data stored or included on a computer-readable medium, such as any of the computer-readable memories described above, including the remote server and vehicles.

In some embodiments, the controller 114 performs one or more of the functions in response to a trigger, such as upon determination of existence of one or more of a predetermined set of parameters. The parameters may consider initiating the learning sequence 300, for example when a power interruption occurs.

The learning sequence 300 begins by initiating the software through the controller 114 as illustrated at start 301.

At block 305, the controller 114 measures and receives input data associated with a load current of the primary lighting system 100. In some embodiments, the controller 114 may measure the input data using sensors or ports 103 configured to receive readings from the power source 102 directly into the controller 114.

The controller 114 may be configured to receive inputs where changes occur to the parameters of the primary lighting system 100. For example, the load current may be received when there is a change to the load current. Inputs may be received at predetermined intervals of time. For example, the load current measured time may be received as an input to the controller 114 every minute or every hour. Where inputs are continually received, the first measurement received by the controller 114 is an initial measurement, for example an initial current measurement ($I_0$).

It is recognized that the controller 114 may receive inputs other than or in addition to current measurements. For example, the controller 114 may receive voltage measurements or other quantifiable metrics.

As illustrated at block 310, the controller 114 calculates power associated with the load of the primary lighting system 100. Once the load current is received as an input, the power is determined by multiplying the current by the voltage of the system. Where the voltage is received as the input, the power is determined by multiplying the voltage by the current.

At decision 315, the controller 114 determines if the load current has changed since a previous input of measurement. For example, where the controller 114 determines the initial current measurement ($I_0$) differs from a subsequent current measurement ($I_1$), e.g., path 317, the controller 114 will re-measure the load current at block 320 and provide an updated current measurement ($I_{update}$) for use within the sequence 300. The updated current measurement ($I_{update}$) is the measured data input that will be used to calculate a backup current value ($I_{backup}$).

Back at decision 315, if the controller 114 determines the current has not changed since a previous input of measurement or where the load current has been re-measured, e.g., path 318, the sequence 300 will use the last measurement as the measurement to calculate the backup current value ($I_{backup}$).

At block 325, the backup current value ($I_{backup}$) is calculated. Since the backup lighting system 126 is designed to maintain a portion of the load 118 during a power outage, only a portion of the original current is needed. The backup current value is directly related to the load current. Specifically, the backup current value is any fractional amount of the load current that would support a desired load during a power outage. Typical backup current values range from one-twentieth (1/20) to one-half (1/2) of the current of the primary system 100. For example, the backup current value can be one tenth (1/10) of the $I_0$ or the $I_{update}$. Furthering the example, where the load current is 1.0 amperes (A) the $I_{backup}$ would be 0.1 A.

The backup current value ($I_{backup}$) can depend on the designated time the backup lighting system 126 is designed to operate during a power outage. For example, where the backup lighting system 126 is intended to operate for 60 minutes, $I_{backup}$ may be a lower value than where the backup lighting system 126 is intended to operate 180 minutes during a power outage.

At block 330, after the backup current value is calculated, $I_{backup}$ is stored internal to the controller 114 (e.g., in a memory) or external to the controller 114 (e.g., in a repository). For example, $I_{backup}$ is stored in a non-volatile portion of the memory 212. Storing $I_{backup}$ allows the controller 114 to later access the value for use. For example, $I_{backup}$ can be retrieved during a subsequent power outage.

At decision 335, the controller 114 determines if a power outage has occurred. A power outage is determined to have occurred where there is an interruption to the power source 102. Specifically, a power outage occurs where the power source 102 no longer provides sufficient energy to carry the load 118.

Where the controller 114 determines a power outage has not occurred, e.g., path 337, the controller 114 will ensure the backup lighting system 126 is not activated at block 340. The controller 114 can verify the backup lighting system 126 is not activated by verifying the switch 124 is deactivated. Specifically, that the switch 124 is in an open position.

Once the controller 114 verifies the backup lighting system 126 is not activated, the sequence 300 returns to block 305 where the current load is measured.

Back at decision 335, where the controller 114 determines a power outage has occurred, e.g., path 338, the controller 114 retrieves $I_{backup}$ at block 345. The backup current value is retrieved from its stored location, for example, from the non-volatile portion of the memory 212.

At block 350, the controller 114 activates the backup lighting system 126. The controller 114 activates the backup lighting system 126 by energizing the switch 124. Specifically, the controller 114 sends a signal to move the switch 124 from an open position to a closed position.

At block 355, the controller 114 provides a signal allowing the backup lighting system 126 to provide the $I_{backup}$ to the load 118. For example, the $I_{backup}$ is provided using the energy source 116.

As described above, when the power source 102 is operational, the charger 110 provides energy to the energy source 116. However, when the power source 102 fails (e.g., during a power outage), the energy stored in the energy source 116, as supplied by the charger 110, is supplied to the backup lighting system 126. When the power source 102 recovers (e.g., power resumes), the load current is again provided by the driver 106 and the energy source 116 receiving charge from the charger 110.

At decision 360, the sequence 300 determines if the energy source 116 is completely discharged (e.g., empty). During an outage, the energy source 116 is discharged during operation of the backup lighting system 126, thus discharging the energy source 116.

Where the energy source 116 has not been completely discharge, e.g., path 362, the sequence 300 returns to decision 335 where the controller 114 determines if a power outage has occurred.

Once the energy source 116 is completely discharged, e.g., path 363, the sequence 300 deactivates the backup lighting system 126 at block 365. The controller 114 can deactivate the backup lighting system 126 by de-energizing the switch 124 (e.g., sending a signal to move the switch 124 from a closed position to an open position).

Where the energy source 116 becomes depleted while a power outage still exists, the controller 114 will deactivate the backup lighting system 126 so as to not damage the backup lighting system 126 (e.g., depletion to a damage-level). For example, where a power outage lasts for 90 minutes, but the predetermined period of time for the energy source 116 is only 60 minutes, the backup lighting system 126 will be deactivated by the controller 114 after 60 minutes to prevent damage.

At end 370, the sequence 300 concludes by disengaging the software through the controller 114. The sequence 300 may conclude according to any of various timing protocols, such as reinstating energy from the power source 102 (e.g., conclusion of a power outage), for example.

CONCLUSION

Those skilled in the art, particularly in light of the foregoing teachings, may make alternative embodiments, examples, and modifications that would still be encompassed by the technology. Further, it should be understood that the terminology used to describe the technology is intended to be in the nature of words of description rather than of limitation.

Those skilled in the art will also appreciate that various adaptations and modifications of the preferred and alternative embodiments described above can be configured without departing from the scope and spirit of the technology. Therefore, it is to be understood that, within the scope of the appended claims, the invention may be practiced other than as specifically described herein.

What we claim is:

1. A backup power system for providing power to a load when a primary lighting system is disabled, the backup power system comprising:
    an energy source configured to supply an amount of power to the backup power system;
    a charger connectable to the energy source and a power source of the primary lighting system;
    a controller configured to measure a load current value of the primary lighting system and determine a backup current value corresponding to an amount of backup current that is a fractional amount of the load current value; and
    a current source configured to provide the determined amount of backup current.

2. The backup power system of claim 1, wherein the energy source is in electrical connection with the charger and the current source using connection wires.

3. The backup power system of claim 2, wherein the connection wires are configured to connect with an external portal for programming the controller.

4. The backup power system of claim 1, wherein the power source is configured to be connectable to a driver of the primary lighting system.

5. The backup power system of claim 4, further comprising a switch in electrical connection with the driver and the current source, the switch allowing the backup current to flow to the load when the switch is in a closed position.

6. The backup power system of claim 1, wherein the controller is configured to receive the load current value required by the primary lighting system to sustain the load.

7. A power system, for providing power to a load, comprising:
    a primary lighting system including (i) a power source having a load current value and (ii) a driver configured to match electrical characteristics of the electrical load; and
    a backup power system connected to the primary lighting system, the backup power system including:
        an energy source configured to supply an amount of power to the backup power system;
        a charger connectable to the energy source;
        a controller configured to measure the load current value of the primary lighting system and determine a backup current value corresponding to an amount of backup current that is a fractional amount of the load current value; and
        a current source configured to provide the determined amount of backup current.

8. The power system of claim 7, wherein the energy source is in electrical connection with the charger and the current source using connection wires.

9. The power system of claim 8, wherein the connection wires are configured to connect with an external portal for programming the controller.

10. The power system of claim 7, wherein the power source is configured to be connectable to the driver of the primary lighting system.

11. The power system of claim 10, further comprising a switch in electrical connection with the driver and the current source, the switch allowing the backup current to flow to the load when the switch is in a closed position.

12. The backup power system of claim 7, wherein the controller is configured to receive the load current value required by the primary lighting system to sustain the load.

13. A computer-readable storage device comprising instructions that, when executed by a processor, cause the processor to perform operations, associated with providing backup power using a backup power system to a load when a primary lighting system is disabled, comprising:
    receiving input data comprising an initial current value corresponding to an amount of energy required by the primary lighting system to sustain a load at a first time;
    determining a backup current value that is a fractional amount of the initial current value, the backup current value corresponding to an amount of backup current needed to sustain at least a portion of the load; and providing, when a power source in connection with the primary system is disabled, the backup current amount to the load using a current source within the backup power system.

14. The device of claim 13, wherein the operations further comprise measuring the initial current value using one or more sensors.

15. The device of claim 13, wherein the operations further comprise calculating an amount of power required to sustain the load, the power calculated using the initial current value.

16. The device of claim 13, wherein the operations further comprise:

receiving a subsequent current value corresponding to an amount of energy required by the primary lighting system to sustain the load a second time;

determining the initial current value is different than the subsequent current value; and calculating the backup current value based on the subsequent current value rather than the initial current value.

17. The device of claim 13, wherein the operations further comprise storing the backup current value to a non-volatile memory within the controller.

18. The device of claim 13, wherein the operations further comprise preventing the backup power system from providing current to the load where a power outage has not occurred, wherein the backup current is arrested by opening a switch in connection with the load, a driver of the primary lighting system, and the current source of the backup power system.

19. The device of claim 13, wherein the operations further comprise deactivating the backup power system where an energy source of the backup power system is depleted.

* * * * *